United States Patent [19]

Kucera

[11] Patent Number: 4,683,068
[45] Date of Patent: Jul. 28, 1987

[54] FRACTURING OF SUBTERRANEAN FORMATIONS

[75] Inventor: Clare H. Kucera, Tulsa, Okla.

[73] Assignee: Dowell Schlumberger Incorporated, Tulsa, Okla.

[21] Appl. No.: 683,974

[22] Filed: Oct. 20, 1984

Related U.S. Application Data

[63] Continuation of Ser. No. 316,186, Oct. 29, 1981, abandoned.

[51] Int. Cl.$^4$ .................... C09K 3/00; E21B 43/26; E21B 43/16
[52] U.S. Cl. .................... 252/8.551; 166/283; 166/305.1; 166/308; 556/51; 556/54
[58] Field of Search ........... 252/8.55 C, 8.55 R, 252/316, 315.01; 260/429.5, 429.3; 536/114; 166/283, 294, 280, 308, 274, 275, 307, 305 R; 556/51

[56] References Cited

U.S. PATENT DOCUMENTS

| | | | |
|---|---|---|---|
| 26,639 | 8/1969 | Gibbons et al. ................ | 260/429.3 |
| 2,901,452 | 8/1959 | West ................ | 260/429.3 |
| 3,056,818 | 10/1962 | Werber ................ | 260/429.3 |
| 3,225,028 | 12/1965 | Nordgren ................ | 536/114 |
| 3,474,069 | 10/1969 | Thomas ................ | 260/429.3 |
| 3,888,312 | 6/1975 | Tiner et al. ................ | 252/8.55 R |
| 3,959,003 | 5/1976 | Ostroot et al. ................ | 252/8.55 R |
| 4,172,055 | 10/1979 | DeMartino ................ | 252/8.55 C |
| 4,210,206 | 7/1980 | Ely et al. ................ | 166/283 |
| 4,250,044 | 2/1981 | Hinckel ................ | 166/308 |
| 4,324,668 | 4/1982 | Harris ................ | 252/8.55 C |
| 4,460,751 | 7/1984 | Hanlon et al. ................ | 525/371 |
| 4,477,360 | 10/1984 | Almond ................ | 252/8.55 R |

FOREIGN PATENT DOCUMENTS

| | | | |
|---|---|---|---|
| 0160990 | 2/1955 | Australia ................ | 260/429.3 |
| 2804355 | 8/1978 | Fed. Rep. of Germany ... | 260/429.3 |
| 0745179 | 2/1956 | United Kingdom ................ | 260/429.3 |
| 0755728 | 8/1956 | United Kingdom ................ | 260/429.3 |
| 0790038 | 1/1958 | United Kingdom ................ | 260/429.3 |
| 1037602 | 7/1966 | United Kingdom ................ | 260/429.3 |

Primary Examiner—Stephen J. Lechert, Jr.
Assistant Examiner—Howard J. Locker
Attorney, Agent, or Firm—L. Wayne White

[57] ABSTRACT

Novel aqueous crosslinked gels are described herein which are useful for fracturing subterranean formations. The novel gels are comprised of a solvatable polysaccharide and a soluble zirconium crosslinking agent. The zirconium crosslinking agents are novel and are prepared by reacting a zirconium alkoxide with certain alkanolamines under anhydrous conditions. The zirconium compounds are activated by contact with water. As an example, a zirconium crosslinker was prepared by reacting zirconium tetra(n-propoxide) with triethanolamine in an n-propanol solvent under anhydrous conditions. The zirconium compound thus prepared was activated with water and used to form a stable aqueous crosslinked gel by blending the aqueous crosslinker into an aqueous hydroxypropylguar solution.

22 Claims, No Drawings

FRACTURING OF SUBTERRANEAN FORMATIONS

This is a continuation of application Ser. No. 316,186, filed Oct. 29, 1981, now abandoned.

BACKGROUND OF THE INVENTION

1. Field of the Invention.

This invention pertains to a novel process for fracturing subterranean formations and to novel aqueous fracturing fluids containing novel zirconium crosslinkers.

2. Description of the Prior Art.

Hydraulic fracturing is a term that has been applied to a variety of techniques used to stimulate the production of oil, gas and other formations fluids from subterranean formations. In hydraulic fracturing, a suitable fracturing fluid is introduced into a subterranean formation by way of a wellbore under conditions of flow rate and pressure which are at least sufficient to create and/or extend a fracture into the desired part of the formation. The fracturing fluid normally carries with it a proppant (e.g. sand, bauxite, etc.) which is forced into the fracture itself and keeps the broken formation from closing down upon itself once the pressure is released.

Various fluids under pressure have been used in hydraulic fracturing. Most of the fracturing fluids used today are aqueous-based liquids which have been either gelled or foamed.

Aqueous gels are usually prepared by blending a polymeric gelling agent with an aqueous medium. Most frequently, the polymeric gelling agent of choice is a solvatable polysaccharide. These solvatable polysaccharides form a known class of compounds which include a variety of natural gums as well as certain cellulosic derivatives which have been rendered hydratable by virtue of hydrophilic substituents chemically attached to the cellulose backbone. The solvatable polysaccharides therefore include galactomannan gums, glucomannan gums, cellulose derivatives, and the like.

The solvatable polysaccharides have a remarkable capacity to thicken aqueous liquids. Even small amounts are sufficient to increase the viscosity of such aqueous liquids from 10 to 100 times or more. In many instances, the thickened aqueous liquid has sufficient viscosity to carry the proppant during the course of the fracturing process and represents a satisfactory fracturing fluid. In other instances, it is necessary to crosslink the polysaccharide in order to form a gel having sufficient strength and viscosity to carry the proppant. A variety of crosslinkers have been developed to achieve this result.

The borate ion has been used extensively as a crosslinking agent for hydrated guar gums and other galactomannans to form aqueous gels used in fracturing and other areas. For example, Kern described a crosslinked system in U.S. Pat. No. 3,058,909 which was used extensively in the oil and gas industry as a fracturing fluid. A fracturing process which comprised crosslinking, guar-containing compositions, on-the-fly with borate ions was described by Free in U.S. Pat. No. 3,974,077. The borate-crosslinked systems require a basic pH (e.g. 8.5 to 10) for crosslinking to occur.

Other crosslinking agents were developed using certain transition metals. Chrisp described certain of these crosslinked systems in U.S. Pat. No. 3,202,556 and U.S. Pat. No. 3,301,723. In U.S. Pat. No. 3,202,556, aqueous solutions of galactomannan gums were crosslinked at a pH of from about 6 to 13 with crosslinking agents selected from the group consisting of compounds of antimony and bismuth. In U.S. Pat. No. 3,301,723 Chrisp described the use of certain titanium, zirconium, and other transition metals as crosslinking agents for galactomannan gums at a pH also in the range from about 6 to about 13. In both Chrisp patents, a basic pH was used to prepare crosslinked materials having utility in the explosive industry.

Another patent which described the use of titanium crosslinkers for solvatable polysaccharides was Tiner et al. (U.S. Pat. No. 3,888,312). The crosslinked gels formed by Tiner were said to be useful as fracturing fluids. The use of such crosslinked gels was alleged to overcome the high friction loss experienced during the pumping of many high viscosity fracturing fluids previously known. This observation corroborated the disclosure by Chrisp in U.S. Pat. No. 3,301,723 at column 10 that crosslinked gels formed using titanium, chromium, iron, and zirconium crosslinkers had a high surface tension (i.e. stickiness and tackiness are absent), ready workability and other desirable physical characteristics.

Chrisp and Tiner et al. each described titanium crosslinkers in which the "amine" portion of the crosslinker was a residue of triethanolamine. Chrisp in U.S. Pat. No. 3,301,723 at column 5, line 60 identified the crosslinker as titanium-triethanolamine chelates. Tiner et al. in U.S. Pat. No. 3,888,312, column 3 at lines 32–35 identifies the compound as bis(triethanolamine) bis(isopropyl)titanium (IV). Chrisp and Tiner et al. also disclosed a wide variety of other compounds in which the "anion" portion of the molecule was something quite different than the triethanolamine residue (e.g. chloride). Chrisp in U.S. Pat. No. 3,301,723 at column 4, lines 33–39 taught that the nature of the particular "anion" in the crosslinking agent was not critical but did have an influence on the solubility of the crosslinking compounds. Tiner et al. likewise taught that the crosslinking ability of their titanium crosslinking agents depended upon the presence of titanium in the +4 oxidation state and that the "anion" portion of the molecule could be varied. This broad teaching in Tiner et al. is once again analogous to the teaching in Chrisp.

Reference is made to the "Handbook of WaterSoluble Gums and Resins" by Robert L. Davidson, Editor as published by McGraw-Hill, Inc. (1980) for an excellent treatise on water soluble polymers which includes a discussion on hydratable (or solvatable) polysaccharides. Reference is also made to "Hydraulic Fracturing" by G. C. Howard and C. R. Fast, Monograph Volume 2, Henry L. Doherty Series, published by the Society of Petroleum Engineers (1970) which is an excellent introduction to the subject of hydraulic fracturing, even though it is now somewhat dated.

SUMMARY OF THE INVENTION

A novel hydraulic fracturing process has now been discovered for fracturing subterranean formations penetrated by a wellbore which comprises introducing into said formation at a flow rate and pressure sufficient to create and/or extend a fracture in the formation an aqueous crosslinked gel comprising an aqueous solvatable polysaccharide and a crosslinking amount of a novel activated zirconium crosslinker. The novel zirconium crosslinkers are produced by reacting by contacting (a) a zirconium alkoxide corresponding to the formula $Zr(OR)_4$ wherein each R independently is an alkyl group of from one to about 4 carbon atoms or an inertly-substituted such alkyl group, with (b) an alkanolamine corresponding to the formula R'—N—CH$_2$—CH(OH)R")$_2$ wherein (i) R' is hydrogen or —CH$_2$—CH(OH)R", and (ii) R" is hydrogen, methyl or ethyl. The process is conducted in a liquid reaction medium under substantially anhydrous conditions. These new zirconium crosslinking agents are activated for use as a crosslinker of solvatable polysaccharides by dissolving them in a small but sufficient amount of water to render the compositions active. The use of such crosslinking agents to gel solvatable polysaccharides is also a new process. Likewise, gellable compositions and crosslinked gelled compositions comprising a solvatable polysaccharide(s) in an aqueous medium and the novel zirconium crosslinker compositions are new.

DETAILED DESCRIPTION OF THE INVENTION

As noted above, the solvatable polysaccharides useful herein constitute a known class of compounds having many members. Any member of this known class which is hydratable in water or an aqueous medium to form a "solution" in which the polysaccharide is uniformly dispersed in the water or aqueous medium and which can be crosslinked by the present class of crosslinkers which contain a polyvalent zirconium ion (i.e. a zirconium atom in the plus four oxidation state) is suitable for use herein. A preferred subclass of polysaccharides includes those polysaccharides which have a plurality of vicinal hydroxy groups oriented sterically in a cis configuration. The broad class of solvatable polysaccharides include galactomannan gums, glucomannan gums, and other such hydrophilic vegetable gums, and certain cellulose derivatives. The solvatable galactomannan gums and glucomannan gums are, of course, naturally occuring. However, the cellulose derivatives are reaction products of cellulose with compounds which render the cellulose derivatives solvatable and crosslinkable by the chemical attachment of hydrophilic constituents to the cellulose backbone. For example, the reaction product of alkali cellulose with sodium chloroacetate gives a product known as carboxymethylcellulose. Similarly, derivatives of the naturally occurring gums can be prepared and used herein so long as the derivatives thereof are solvatable and crosslinkable. For example, the reaction product of guar gum with propylene oxide gives a derivative known as hydroxypropylguar which is particularly useful herein.

The molecular weight of the solvatable saccharides can be varied over a wide range depending upon the particular utility to which the crosslinked gel is to be used. If the crosslinked gel is to be utilized as a fracturing fluid, then polysaccharides having a molecular weight of at least about 100,000 are normally used and those having molecular weights of from about 200,000 to about 300,000 are normally preferred.

The known class of solvatable polysaccharides includes, for example, locust bean gum and guar gum, as well as other galactomannan and glucomannan gums, such as those from endosperms of seeds of other leguminous plants such as the sennas, Brazilwood, Tera, Honey locust, Karaya gum and the like. Other examples include derivatives of such gums, such as hydroxyethylguar, hydroxypropylguar, carboxyethylhydroxyethylguar, carboxymethyhydroxypropylguar, and the like. Other examples, include cellulose derivatives containing carboxyl groups such as carboxymethylcellulose, carboxymethylhydroxyethylcellulose, and the like. Cellulose derivatives containing only hydroxy/alkyl groups (e.g. hydroxyethylcellulose) are not crosslinked to any appreciable degree by the zirconium crosslinkers and are, therefore, excluded from the class of polysaccharides useful herein. Guar gum, hydroxypropylguar, and locust bean gum are preferred polysaccharides for use in the present invention and hydroxypropylguar is the most preferred gum based upon its commercial availability and desirable properties. The solvatable polysaccharides can be used individually or in combination; usually, however, a single material is used.

In the present invention, the solvatable polysaccharides are normally blended with water or an aqueous medium (e.g. aqueous methanol, ethanol, 1 to 3% HCl, potassium chloride, etc.) to form an uncrosslinked gel as a first step. Like any chemical reaction, the rate of solvation of the particular polysaccharide will vary with the particular combination of solvent and polysaccharide chosen. Because of this, it is generally advantageous to preblend the polysaccharide with the particular solvent medium to obtain a smooth uniform gel before blending in the crosslinker. As used herein, a "gel" is a homogenous or substantially homogenous solid/liquid mixture in which the solid particles vary in size down to substantially colloidal dimensions and the mixture is capable of resisting a finite shearing force, such resistance to shearing is usually evidenced by viscosity measurements.

The amount of solvatable polysaccharide that is used in making a gel can vary in the instant invention. Usually only a small amount of polysaccharide is required because of the high efficiency that such polysaccharides display in thickening aqueous media. For most applications, satisfactory gels are made by adding the solvatable polysaccharide in amounts up to about 5 weight percent, based on the weight of the aqueous liquid. Preferred amounts of polymer generally range from about 0.3 to about 3 weight percent.

The aqueous media, is usually water or water/alcohol mixtures. The aqueous media can of course contain other additives which increase the rate of solvation of the polymer or perform some other desirable function. For example, the aqueous media can contain buffering agents, acids or bases, iron control agents (e.g. chelating agents, such as the sodium salts of ethylenediaminetetraacetic acid), bactericides, diesel oil, chemical breakers which break the crosslinked polymers in a controlled manner, stabilizers, surfactants, formation control agents, etc. Such additives may be added to the aqueous gel before or after the polysaccharide is solvated, but generally are added after.

It should be noted that the gels formed by blending the solvatable polysaccharide with an aqueous media are uncrosslinked gels. Such gels have an increased viscosity but they are substantially weaker than the crosslinked gels and the uncrosslinked gel structure can be broken (rather easily in most instances) by temperature, high shear, and/or the presence of dissolved electrolytes.

The crosslinkers used in the present invention are a novel class of compounds. The crosslinkers are produced by reacting by contacting (a) a zirconium alkoxide corresponding to the formula Zr(OR)$_4$ wherein each R independently is an alkyl group of 1 to about 4 carbon atoms or an inertlysubstituted such alkyl group, with (b) an alkanolamine corresponding to the formula R'—N—CH$_2$—CH(OH)—R")$_2$, wherein (i) R' is hydrogen or —CH$_2$—CH(OH)—R", and (ii) R" is hydrogen, methyl or ethyl. The process is conducted in a liquid reaction medium under substantially anhydrous conditions. The liquid reaction medium can be varied to convenience but it is advantageously selected so as to be compatible with the ultimate crosslinked fluids. Thus for example, one can use a slight excess of the alkanolamine reactant as the liquid reaction medium or one can use an inert liquid solvent (e.g. a lower alkanol of from 1 to about 4 carbon atoms). Methanol, ethanol and propanol are usually the solvent mediums of choice.

The ratio of reactants used in the process can vary but normally a ratio of from about 2 to about 3 moles of alkanolamine are used per mole of zirconium alkoxide.

The reaction is conveniently conducted by merely blending the reactants in the liquid reaction medium and maintaining the reactants in contact at a suitable reaction temperature until the evolution of alkanol (R—OH) is essentially complete. The reaction tends to be exothermic and the reaction temperature normally increases to about 100° F. by merely blending the reactants. Subsequent reaction can be achieved by maintaining the reaction mixture at an elevated temperature (e.g. from about 100° to about 150° F.) under conditions that exclude water. In most instances, the reaction is substantially complete and from about 1 to about 6 hours.

The crosslinkers, as they are prepared, are activated as crosslinkers by adding to the reaction mixture a sufficient amount of water to render the composition active as a crosslinker. This can be easily determined by preparing a solution of 40 pounds of hydroxypropylguar per 1,000 gallons of water and adding amounts of crosslinker to 500 ml of this standard hydroxypropylguar solution with mixing and thereafter measuring the viscosity. The nonactivated crosslinkers perform poorly, if at all, as a crosslinker. However, crosslinkers which have been sufficiently activated with water will crosslink the hydroxypropylguar in about 5 minutes and the crosslinked solution will have a viscosity of greater than about 50,000 centipoise, as measured on a Brookfield LVF viscometer. Usually, crosslinking is essentially instantaneous upon mixing the activated crosslinkers with the HPG solution. More water can be used, but excellent results are achieved with a dilution factor of from about 4 to about 5 parts of water per part by volume of zirconium crosslinker reaction product.

The novel zirconium crosslinkers described herein can be used to crosslink the solvatable polysaccharide in solution over a wide range of pH. For example, the zirconium crosslinkers could be used to crosslink solutions over a pH range of from about 2 to about 12. Normally, however, one would prefer to crosslink the polysaccharide solutions over a pH from about 5 to about 10, more preferably from about 8.5 to about 10. The pH ranges referred to above are measured at 20° C. on solutions of the polysaccharide prior to the addition of the zirconium crosslinker. The pH always goes up (usually to pH 7-9.5) upon addition of the crosslinker.

The novel crosslinkers are, of course, included in the polysaccharide solutions in an amount sufficient to generate the desired degree of crosslink. Typically, however, it is found convenient to include the zirconium crosslinkers in amounts of from about 0.01 to about 0.2 weight percent, based upon the weight of the solvatable polysaccharide solution.

The novel crosslinkers can be used to crosslink solvatable polysaccharide solutions and the crosslinked materials can be used for a wide range of purposes. However, one of the most predominant uses for such crosslinked fluids is as a fracturing fluid.

The crosslinkers perform well in making crosslinked fracturing fluids. Normally, the crosslinkers are added to the solvated polysaccharide solutions (containing proppant and other additives) as the materials are being pumped and crosslinking subsequently occurs at ambient temperatures or above as the material is pumped through the tubing into the formation at wellbore conditions.

Fracturing fluids must meet many rigid requirements in terms of physical and chemical characteristics. In most fracturing operations, a spearhead or pad of fracturing fluid (without proppant) is normally introduced into the wellbore and against the face of the formation. This pad is followed immediately by a fracturing fluid containing the proppant in most instances. In order to carry the proppant it is neccessary for the fracturig fluid to have sufficient viscosity to hold the sand or other proppant until the full extend of the fracture has been realized. This is a very difficult requirement because the fracturing fluid is subjected to very high shear as well as high temperatures in many instances. Such conditions of shear and temperature tend to rapidly degrade most polymers and the degradation results in reduced viscosity. When this happens, a "sand out" occurs as the proppant begins to fall. The present crosslinked fracturing fluids are uniquely effective in retaining viscosity under severe conditions of temperature and shear.

The class of fracturing fluids comprise a solvatable polysaccharide solution along with a crosslinking amount of one (or more) of the present zirconium crosslinkers. Such fracturing fluids may also contain other conventional additives which are added in known amounts and by conventional techniques. For example, proppants (e.g., sand, bauxite, etc.), friction reducers (e.g. polyacrylamides, etc.), breakers (e.g. enzymes, alkali metal persulfates, ammonium persulfate, etc.), stabilizers (e.g. methanol, alkali metal thiosulfate annonium thiosulfate, etc.), pH buffering agents, diesel oil and other hydrocarbons, surfactants, clay stabilizers, bactericides, iron control agents, low molecular weight alcohols (e.g. methanol, ethanol, isopropanol, etc.), gases (e.g. normally gases hydrocarbons, nitrogen, carbon dioxide, etc.), and the like.

The processes of using such formulated fracturing fluids as well as mixing them are well known to those skilled in the art.

EXPERIMENTAL

The following experiments will further illustrate the invention. The experiments are divided into different "series" for convenience.

FIRST SERIES 1-1. Preparation of zirconium crosslinkers: Zirconium tetra(n-propoxide), $Zr—OCH_2CH_2CH_3)_4$, was reacted with anhydrous triethanolamine by blending one volume of zirconium tetra(n-propoxide) with one, two, or three volumes of triethanolamine under anhydrous conditions. There was an initial temperature exotherm upon blending. After the exotherm had subsided, additional n-propanol was added in amounts of from 3 to 17.5 volumes of n-propanol per volume of zirconium tetra(n-propoxide). The temperature of the anhydrous stirred reaction mixture was then brought to approximately 180° F. and maintained at this reflux temperature for approximately 4 hours. At the end of this time, the reaction products were cooled to room temperature and each were obtained as clear n-propanol solutions of a complex mixture of compounds in which the zirconium ion appears to have coordination number of 6 and/or 8, based upon the stoichiometery of the reaction and the amount of n-propanol produced during reaction.

TABLE I

Preparation of Crosslinkers with Different Ratios of Zr:TEA

| | Composition # | | | | |
|---|---|---|---|---|---|
| | 1 | 2 | 3 | 4 | 5 |
| $Zr(OCH_2CH_2CH_3)_4$ | 10 mL. | 10 | 10 | 10 | 10 |
| Triethanolamine | 5 mL. | 10 | 15 | 20 | 15 |
| n-propanol | 45 mL. | 40 | 35 | 30 | 175 |
| Total | 60 mL. | 60 | 60 | 60 | 200 |

The reaction product produced by reacting 1.5 volumes of triethanolamine per volume of zirconium tetra (n-propoxide) is the preferred crosslinker. The proposed chemical name for this compound is zirconium bis-n-propanol tris(triethanolamine) complex. A 12.5 weight percent solution of this complex in n-propanol has the following physical/chemical properties: boiling point (760 mm) 180° F.; a melting point below $-100°$ C.; a specific gravity (60° F.) of 0.837; a refractive index (77° F.) of 1.395; a flash point (SETA open cup) of 77° F.; a coefficient of expansion of $100 \times 100^{-5}$; a vapor density greater than air; physical description—a pale yellow liquid; an acute oral toxicity in male rats of an $LD_{50}$ greater than 10,000 milligrams per kilogram of body weight; an acute oral toxicity in female rats of an $LD_{50}$ of approximately 4588 milligrams per kilogram of body weight; eye irritation was rated moderate to severe; a skin irritation on intact and abraded skin (tested on rabbits) of 1.29 out of a possible primary irritation score of 8.0; and acute percutaneous absorption of an $LD_{50}$ greater than 4,000 milligrams per kilogram of body weight.

1-2. Preparation of the activated crosslinkers: The reaction products 1 through 4 from 1-1 Table I were activated by diluting one volume of reaction product with nine volumes of water and reaction product 5 from 1-1 Table I was activated by adding one volume of reaction product with 2 volumes of water. The reaction products were each very soluble in water and appeared to hydrolyze quickly to form the activated zirconium crosslinker species. The anhydrous reaction product has excellent shelf-life stability when sealed in a dry container; but the activated species has, by comparison, a poor shelf-life and appears to form polymers after a period of time which precipitate from solution.

1-3. Preparation of crosslinked gels: An aqueous polymer "solution" was first prepared containing 40 pounds of a commercial hydroxypropylguar (HPG) per thousand gallons of formulated liquid. The activated zirconium/triethanolamine complexes from 1-2 were then added to aliquots of the HPG solution in amounts equivalent to six gallons of activated crosslinker solution per thousand gallons of formulated liquid, with the exception that the crosslinker composition #5 from 1-1 was added in amounts equivalent to 2 gallons per 1000; thus, each of the crosslinked gels contained equivalent amounts of zirconium. Reaction Products 1-4, Table I each contain 10 parts zirconium propoxide to 60 parts of product. When these are diluted with 9 parts of water to prepare a 10% solution, the amount of zirconium (based upon zirconium propoxide) present in each is $10/60 \times 1/10 = 0.0167$, and the amount of zirconium in 6 gallons is $6 \times 0.0167 = 0.1$. Reaction product 5, Table I, contains 10 parts zirconium propoxide to 200 parts of product. When this product is diluted with 2 parts of water to prepare a $33\frac{1}{3}\%$ solution, the amount of zirconium present is $10/200 \times \frac{1}{3} = 0.0167$ and the amount of zirconium (as zirconium propoxide) in 6 gallons is $6 \times 0.0167 = 0.1$. All crosslinked fluids therefore contain the same amount of zirconium per 1000 gallons of formulated fluid. In each instance, crosslinking occurred almost instantaneous with blending (e.g. within about 5 to 10 seconds) and the gels thus formed had a viscosity of greater than about 20,000 centipoise (cps) as measured on a Brookfield LVF viscometer with a #4 spindel at 12 revolutions per minute (RPM) at ambient conditions.

To provide more meaningful information as to how such crosslinked gels might perform as fracturing fluids, which are subjected to high temperatures and pressures in deep wells, the apparent viscosity of the fluids were calculated from data obtained on a Fann Model 50C viscometer at 170 reciprocal seconds or 511 reciprocal seconds at 275° F. The apparent viscosity is calculated from the formula: Apparent Viscosity (cps) = 47880 K' (shear rate)$_{n'-1}$ where K' is the consistency index and n' is the flow behavior index. The power law model is applied to calculate both the consistency index and the flow behavior index. The consistency index is based on a pipeflow geometry and has been corrected according to Savins, Petr. Tr. AIME, B213, 1958. The power law parameters are defined as:

n' = log slope of shear stress versus shear rate
K' = shear stress at 1 reciprocal second.

In these formulas n' is dimensionless. The units of K' are ($lbs_F-sec^{n'}/ft^2$). This treatment of viscosity data from the Fann Model 50 or 50C viscometer is conventional in the art.

The data in Table II shows the calculated apparent viscosities at 275° F. of crosslinked gels prepared, as noted above with HPG at 40 pounds per 1000 gallons and equivalent amounts of activated crosslinker, based on amounts of zirconium in the crosslinker.

TABLE II

| | Apparent Viscosity of Crosslinked Fluid (cps) Activated Crosslinker Compositions | | | | |
|---|---|---|---|---|---|
| Time, Hr. | 1 | 2 | 3 | 4 | 5 |
| 1 | 66 cps | 149 cps | 374 cps | 214 cps | 517 cps |
| 2 | 39 | 102 | 263 | 115 | 388 |
| 3 | 24 | 70 | 185 | 62 | 252 |
| 4 | 14 | 48 | 120 | 33 | 164 |
| 5 | 8 | 33 | 92 | 18 | 107 |

By comparison, the apparent viscosity of an uncrosslinked HPG solution at 275° F. under the same conditions is essentially not measureable but is in the range of about 1 or 2 cps. The data in Table II show clearly that each of the zirconium/triethanolamine products, as activated, is an effective crosslinking agent for HPG in aqueous solutions. Compositions 3 and 5 in which 1.5 volumes of triethanolamine were reacted with 1 volume of zirconium tetra(n-propoxide) appear to be superior to the other reaction products in terms of initial building of viscosity and retention of viscosity.

SERIES TWO

Effect of water dilution on the performance of the zirconium complexes as crosslinkers 2-1. A stock solution was prepared containing 40 pounds of HPG, 10 pounds of a stabilizer (sodium thiosulfate) and approximately 83.4 pounds of potassium chloride/1000 gallons of formulated fluid. The formulated fluid was treated with 6% aqueous sodium carbonate solution until the pH of the stock solution was raised to pH 9.0. Aliquots of this solution were then crosslinked by adding an activated zirconium triethanol complex as represented by composition 5 in Table I to the stock HPG solution. The zirconium triethanolamine crosslinker was activated using different volumes of water. The volumes of water shown in Table III are all relative to 1 volume of zirconium/triethanolamine reaction product from 1-1. The viscosities are Apparent Viscosities measured at 275° F. using data from the Fann Model 50C at 170 reciprocal seconds.

TABLE III

Effect of Water Dilution on the Performance of Zr/TEA Complex

| Time, Hrs. | Dilution Ratio | | | | |
|---|---|---|---|---|---|
| | No Water | 1:1 | 1:2 | 1:3 | 1:4 |
| 1 | 175 cps | 253 cps | 537 cps | 678 cps | 510 cps |
| 2 | 121 | 179 | 349 | 504 | 249 |
| 3 | 83 | 127 | 231 | 375 | 121 |
| 4 | 57 | 90 | 152 | 278 | 59 |
| 5 | 40 | 64 | 99 | 207 | 28 |
| 6 | 27 | 45 | 66 | 154 | 14 |
| 7 | 19 | 32 | 43 | 114 | 6 |
| 8 | 13 | 23 | 28 | 85 | 3 |

These data show that a dilution ratio of 1:3 in which 3 volumes of water were blended with 1 volume of zirconium/triethanolamine reaction product appears to be an optimum dilution to activate the crosslinker.

SERIES THREE

Crosslinking of polymer mixtures 3-1. The activated crosslinker represented by one volume of composition 3 to Table II diluted with 9 volumes of water was blended at a rate of approximately 6 gallons of crosslinker solution/1000 gallons of formulated fluid with aqueous solution of HPG, guar, and a 50/50 HPG/Guar mixture. The apparent viscosities on these crosslinked solutions is shown in Table IV.

TABLE IV

| Polymer (lbs/1000 gal.) | | Viscosity at 275° F. |
|---|---|---|
| HPG | Guar | (cps) |
| 40 | — | 626 |
| — | 40 | 535 |
| 20 | 20 | 617 |

SERIES FOUR

The effect of pH on the crosslinking of various polymers solutions 4-1. The crosslinker composition represented by one volume of composition No. 3 in Table II diluted with 9 volumes of water was used to crosslink a series of polymers. The crosslinker composition was effective in crosslinking solutions of carboxymethylhydroxypropylguar, carboxymethylhydroxyethylcellulose, guar, carboxymethylcellulose, and HPG.

In this series of experiments, stock solutions of the various polymers were prepared and then divided into several equal portions. The pH of each of the portions was then subsequently adjusted with acid or base, so that there was a series of fluids having the same polymer loading, but different pH values (e.g. pH 2, 3, 4, 5, etc.). The activated crosslinker was then added in constant amounts to these different solutions and the apparent viscosity of the crosslinked fluids was again determined at 275° F. on a Brookfield LVF viscometer.

The effectiveness of the crosslinker in crosslinking HPG rose steadily from an initial pH of the solution of about 1.5 to about 3.7 and thereafter seemed to reach a consistent high plateau. These data indicate that while HPG solutions can be gelled at a pH of 1.5, for example, crosslinked gels having a higher viscosity are formed when the initial solution has a pH of 3.7 or higher. A similar pattern was observed on the crosslinking of guar. On carboxymethylcellulose, the crosslinker seemed to be most effective in crosslinking the polymer at an initial solution pH of from about 3 to about 5. For carboxymethylhydroxyethylcellulose, the crosslinker seemed to be most effective in the initial pH range of from about 2 to about 4. On carboxymethylhydroxypropylguar, there appeared to be an increase in viscosity of the crosslinked system between the pH of from about 1 to about 3 (with an optimum of about pH 2) and then the viscosity began to increase dramatically again at about a pH of 4 and went steadily upward. The pH of the fluids always increased with the addition of the crosslinker. The amount of the pH change also varied with the particular polymeric thickener. No general conclusion could be drawn from this particular series of experiments except that the crosslinker composition was particularly effective in crosslinking guar and hydroxypropylguar solution over a very wide initial pH range. It should be noted, however, that under these test conditions that when the initial solution had a low pH of from about 2 to 3 for either guar or hydroxypropylguar, the final pH of the crosslinked solution was generally in the range of from 7 to 9 or higher. The optimum pH range for crosslinking other polymers may vary, but that is easily determined by one of ordinary skill in the industry.

What is claimed is:

1. A process for gelling a solvatable polysaccharide having a plurality of vicinal hydroxy groups oriented sterically in a cis configuration and a molecular weight of at least about 100,000 comprising blending an aqueous solution of said solvatable polysaccharide with a crosslinking amount of a crosslinker composition consisting essentially of
(a) a product produced by reacting by contacting
  (i) a zirconium alkoxide corresponding to the formula Zr(OR)$_4$ wherein each R independently is an alkyl group of from 1 to about 4 carbon atoms or an inertly-substituted such alkyl group, with
  (ii) an alkanolamine corresponding to the formula R'—N(CH$_2$—CH(OH)—R")$_2$, wherein
    (aa) R' is hydrogen or —CH$_2$—CH(OH)—R", and
    (bb) R' is hydrogen, methyl or ethyl; said process being conducted in a liquid reaction medium under substantially anhydrous conditions and using a molar ratio of a:b of from about 1:2 to about 1:3, and
(b) a sufficient amount of water to render the product, (a), active as a crosslinker.

2. In the process for fracturing a subterranean formation penetrated by a wellbore which comprises introducing a hydraulic fracturing fluid into said formation at a flow rate and pressure sufficient to create, reopen and/or extend a fracture in said formation, the improvement comprising using an aqueous crosslinked gel as the hydraulic fracturing fluid which comprises an aqueous solvatable polysaccharide a plurality of vicinal hydroxy groups oriented sterically in a cis configuration and a molecular weight of at least about 100,000, and a crosslinking amount of a crosslinker composition consisting essentially of
(a) a product produced by reacting by contacting
  (i) a zirconium alkoxide corresponding to the formula Zr(OR)$_4$ wherein each R independently is an alkyl group of from 1 to about 4 carbon atoms or an inertly-substituted such alkyl group, with
  (ii) an alkanolamine corresponding to the formula R'—N(CH$_2$—CH(OH)—R")$_2$, wherein
    (aa) R' is hydrogen or —CH$_2$—CH(OH)—R", and
    (bb) R' is hydrogen, methyl of ethyl; said process being conducted in a liquid reaction medium under substantially anhydrous conditions and using a molar ratio of a:b of from about 1:2 to about 1:3, and
(b) a sufficient amount of water to render the product, (a), active as a crosslinker.

3. A process for fracturing a subterranean formation penetrated by a wellbore which comprises the step of:
(a) substantially continuously injecting
  (i) a crosslinking amount a crosslinker composition consisting essentially of a product produced by reacting by contacting
    (aa) a zirconium alkoxide corresponding to the formula Zr(OR)$_4$ wherein each R independently is an alkyl group of from 1 to about 4 carbon atoms or an inertly-substituted such alkyl group, with
    (bb) an alkanolamine corresponding to the formula R'—N(CH$_2$—CH(OH)—R")$_2$, wherein
      (i) R' is hydrogen or —CH$_2$—CH(OH)—R", and
      (ii) R' is hydrogen, methyl or ethyl; said process being conducted in a liquid reaction medium under substantially anhydrous conditions and using a molar ratio of a:b of from about 1:2 to about 1:3, and
  (ii) a sufficient amount of water to render the product, (i), active as a crosslinker, into
  (iii) a flowing stream of an aqueous solvatable polysaccharide having a plurality of vicinal hydroxy groups oriented sterically in a cis configuration and a molecular weight of at least about 100,000 to thereby form a flowing crosslinkable fracturing fluid
(b) introducing said flowing crosslinkable fracturing fluid into the wellbore at a flow rate and pressure sufficient to permit said crosslinkable fracturing fluid to gel and increase in viscosity while it is passing through the borehole, and,
(c) introducing said aqueous gelled fracturing fluid into said formation at a flow rate and pressure at least sufficient to create, reopen and/or extend a fracture in said formation.

4. The process defined by claim 1, 2 or 3 wherein said solvatable polysaccharide is a galactomannan or glucomannan gum or a cellulose derivative.

5. The process defined by claim 1, 2 or 3 wherein said solvatable polysaccharide is guar and/or hydroxypropylguar.

6. The process defined by claim 1, 2 or 3 wherein said solvatable polysaccharide has a molecular weight of from about 200,000 to about 300,000.

7. The process defined by claim 1, 2 or 3 wherein the pH of said aqueous solvatable polysaccharide is from about 2 to about 12.

8. The process defined by claim 1, 2 or 3 wherein the pH of said aqueous solvatable polysaccharide is from about 5 to about 10.

9. The process defined by claim 1, 2 or 3 wherein the pH of said aqueous solvatable polysaccharide is from about 8.5 to about 10.

10. The process defined by claim 1, 2, or 3 wherein said fracturing fluid has a neutral or basic pH.

11. The process defined by claim 1, 2 or 3 wherein said solvatable polysaccharide is guar, hydroxypropylguar, carboxymethylhydroxypropylguar, carboxymethylcellulose or carboxymethylhydroxyethylcellulose.

12. The process defined by claim 2 or 3 wherein said hydraulic fracturing fluid additionally comprises sand, bauxite, glass beads or other proppants which are particulate solids.

13. The process defined by claim 2 or 3 wherein fracturing fluid additionally comprises a breaker.

14. The process defined by claim 13 wherein said breaker is an enzyme or alkali metal pursulfate or ammonium pursulfate.

15. The process defined by claim 2 or 3 wherein said hydraulic fracturing fluid additionally comprises a stabilizer.

16. The process defined by claim 15 wherein said stabilizer is an alkali metal thiosulfate or ammonium thiosulfate or methanol.

17. A process for gelling a solvatable polysaccharide comprising blending an aqueous solution of said solvatable polysaccharide at a pH of above about 5 with a crosslinking amount of a crosslinker composition consisting essentially of
(a) a product produced by reacting by contacting
  (i) a zirconium alkoxide corresponding to the formula Zr(OR)$_4$ wherein each R independently is an alkyl group of from 1 to about 4 carbon atoms or an inertly-substituted such alkyl group, with
  (ii) an alkanolamine corresponding to the formula R'—N(CH$_2$—CH(OH)—R")$_2$, wherein
    (aa) R' is hydrogen or —CH$_2$—CH(OH)—R", and
    (bb) R' is hydrogen, methyl or ethyl; said process being conducted in a liquid reaction medium under substantially anhydrous conditions and using a molar ratio of a:b of from about 1:2 to about 1:3, and (b) a sufficient amount of water to render the product, (a), active as a crosslinker.

18. In the process for fracturing a subterranean formation penetrated by a wellbore which comprises introducing a hydraulic fracturing fluid into said formation at a flow rate and pressure sufficient to create, reopen and/or extend a fracture in said formation, the improvement comprising using an aqueous crosslinked gel as the hydraulic fracturing fluid which comprises an aqueous solvatable polysaccharide at a pH above about 5 and a crosslinking amount of (a) a product produced by reacting by contacting
   (i) a zirconium alkoxide corresponding to the formula $Zr(OR)_4$ wherein each R independently is an alkyl group of from 1 to about 4 carbon atoms or an inertly-substituted such alkyl group, with
   (ii) an alkanolamine corresponding to the formula $R'-N(CH_2-CH(OH)-R'')_2$, wherein
      (aa) R' is hydrogen or $-CH_2-CH(OH)-R''$, and
      (bb) R' is hydrogen, methyl or ethyl; said process being conducted in a liquid reaction medium under substantially anhydrous conditions and using a molar ratio of a:b of from about 1:2 to about 1:3, and (b) a sufficient amount of water to render the product, (a), active as a crosslinker.

19. A process for fracturing a subterranean formation penetrated by a wellbore which comprises the steps of:

(a) substantially continuously injecting a crosslinking amount of a crosslinker composition consisting essentially of
   (i) a product produced by reacting by contacting
      (aa) a zirconium alkoxide corresponding to the formula $Zr(OR)_4$ wherein each R independently is an alkyl group of from 1 to about 4 carbon atoms or an inertly-substituted such alkyl group, with
      (bb) an alkanolamine corresponding to the formula $R'-N(CH_2-CH(OH)-R'')_2$, wherein
         (i) R' is hydrogen or $-CH_2-CH(OH)-R''$, and
         (ii) R' is hydrogen, methyl or ethyl; said process being conducted in a liquid reaction medium under substantially anhydrous conditions and using a molar ratio of a:b of from about 1:2 to about 1:3, and
   (ii) a sufficient amount of water to render the product, (i), active as a crosslinker into
   (iii) a flowing stream of an aqueous solvatable polysaccharide at a pH above about 5 to thereby form a flowing crosslinkable fracturing fluid, (b) introducing said flowing crosslinkable fracturing fluid into the wellbore at a flow rate and pressure sufficient to permit said crosslinkable fracturing fluid to gel and increase in viscosity while it is passing through the wellbore, and (c) introducing said aqueous gelled fracturing fluid into said formation at a flow rate and pressure at least sufficient to create, reopen and/or extend a fracture into said formation.

20. The process defined by claim 1, 2, 3, 17, 18 or 19 wherein R" is hydrogen.

21. The process defined by claim 20 wherein R' is $-CH_2-CH_2-CH_2-OH$.

22. The process defined by claim 21 wherein each R is n-propyl.

* * * * *